(No Model.)
DE LEON DAVIS.
MOTIVE POWER APPARATUS.
No. 564,506. Patented July 21, 1896.
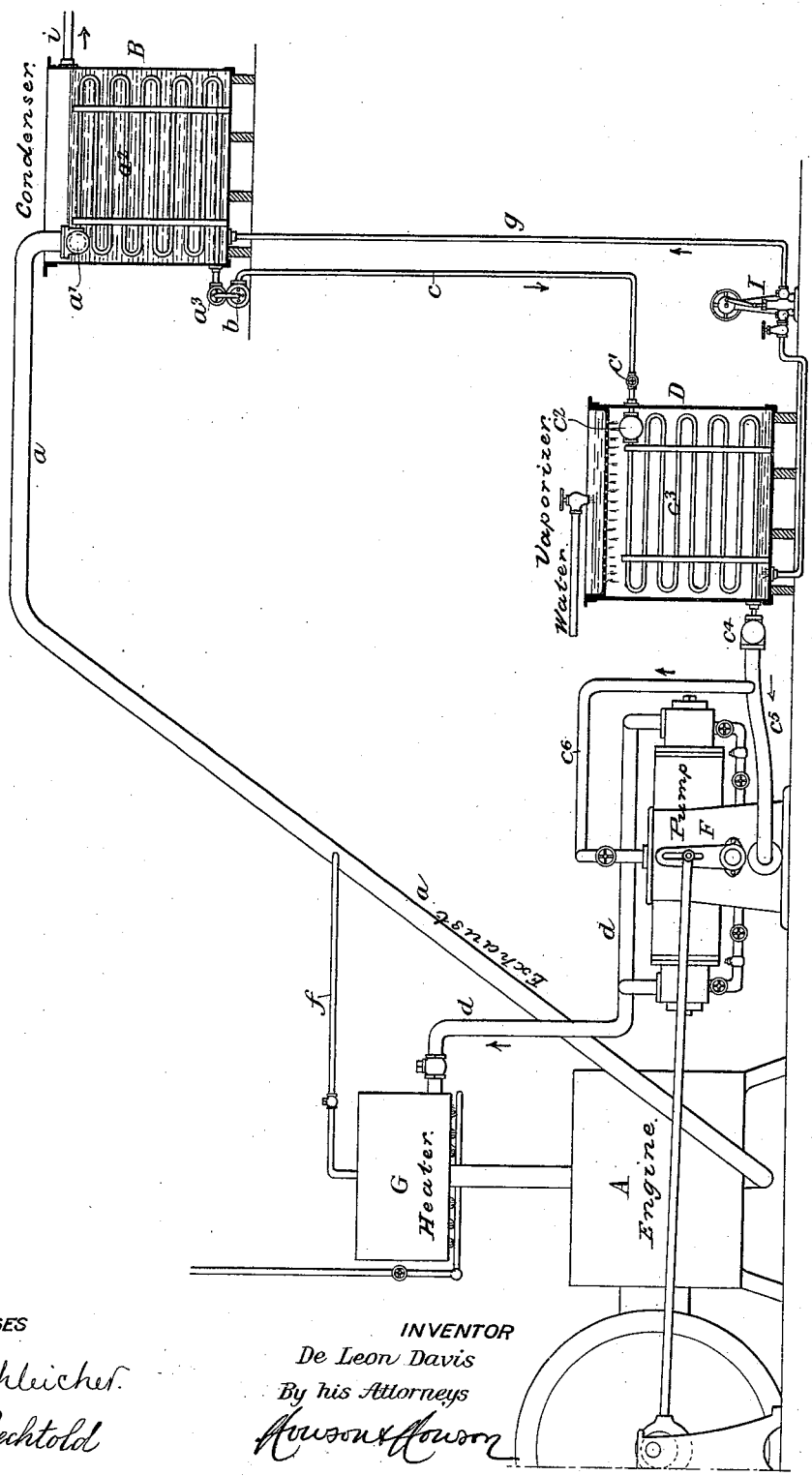
WITNESSES
R. Schleicher.
Frank Bechtold
INVENTOR
De Leon Davis
By his Attorneys
Howson & Howson

UNITED STATES PATENT OFFICE.

DE LEON DAVIS, OF PHILADELPHIA, PENNSYLVANIA.

MOTIVE-POWER APPARATUS.

SPECIFICATION forming part of Letters Patent No. 564,506, dated July 21, 1896.

Application filed February 24, 1894. Serial No. 501,445. (No model.)

*To all whom it may concern:*

Be it known that I, DE LEON DAVIS, a citizen of the United States, residing in Philadelphia, Pennsylvania, have invented an Improved Motive-Power Apparatus, of which the following is a specification.

My invention has for its object a commercially practicable and economical apparatus for the purpose of using for the production of power certain fluids, of which anhydrous ammonia may be selected as an example, which fluids have three critical points or periods of change, that is to say, from the liquid to the vaporous form, from the vaporous form to the gaseous form, and from the gaseous form back again to the liquid.

The operation comprises a certain cycle of operations, which, starting with the liquid form of the fluid, may be briefly stated as follows: The fluid is continuously under pressure, which pressure varies at different stages of the operation. The first step in the operation is to permit of the expansion of the fluid so that its pressure is reduced to such a degree that it will, under ordinary temperatures of air or water, pass the first critical point or change from the liquid to the vaporous form, or will, in other words, reacquire the latent heat which was removed from it in the operation of condensing it to the liquid form. The vaporous fluid is then introduced into a receiver, in which it is maintained under pressure and is subjected to heat, and thus acquires a degree of sensible heat, the increase in temperature being accompanied by a corresponding increase in pressure and carrying the fluid past the second critical point or change from the vaporous to the gaseous form. The fluid under this high pressure and temperature is then admitted to the motive-power engine, in which it is expanded to a certain extent, care being taken that the gas exhausted from the engine is still under such pressure and retains such a degree of temperature that it can be condensed or carried past the third critical point or change from gas to liquid without being subjected to an inordinate degree of cold. For instance, if anhydrous ammonia is the motive fluid employed, and this fluid is exhausted from the power engine at an indicated pressure of eighty-five pounds to the square inch, it can be condensed or reduced to the liquid form by subjecting it to a temperature of 55° Fahrenheit, whereas if it is exhausted at atmospheric pressure it will require for condensation a temperature far below zero, Fahrenheit.

The aim in practice will be to so expand the fluid in the motive-power engine as to deprive it of all the sensible heat which was imparted to it before it entered the engine, so that this sensible heat is converted into energy, the function of the condenser being simply to deprive of its latent heat the fluid exhausted from the engine, and thereby again restore said fluid to the liquid form prior to a repetition of the cycle of operations.

While it may not be possible in all cases to practically convert into energy in the motive-power engine all of the sensible heat imparted to the fluid, but a very small percentage of such sensible heat will be likely to find its way to the condenser, hence my invention provides a means whereby the energy developed by the engine approaches the theoretical energy of the heat employed much more closely than is possible with the best and most economical forms of steam and other engines now in use.

The economy of my practice is due in great measure to the fact that the gas is exhausted from the engine while still under such pressure that it can be condensed without the use of an excessively-low temperature and to the further fact that the sensible heat imparted to the fluid does not have to restore to the latter any of the latent heat of which it was deprived in condensing it to the liquid form, such latent heat having been restored prior to the application of sensible heat by expanding the fluid and thus reducing the pressure of the same to such an extent that it can reabsorb latent heat from air, water, or like agent at ordinary temperature, this change being thus effected without the employment of artificial means and therefore without expense. This will be understood when it is borne in mind that anhydrous ammonia, under a pressure of fifty pounds to the square inch, will boil or become vaporized at a temperature of 35° Fahrenheit. Hence, if the liquid from the condenser at a pressure of, say, eighty-five pounds to the square inch is permitted to expand so as to reduce is pressure to fifty pounds to the square inch, and is at the same time subjected to a temperture of 35° Fahrenheit or over, it will at once assume the vaporous form by extracting latent heat from the agent used for the purpose. The agent which is employed for effecting the vaporization of the expanded fluid is thereby considerably lowered in temperature and is available for use in the condenser, the gas exhausted from the motive-power engine being by preference under such pressure that it will, when subjected to a temperature such as that represented by the agent from the vaporizer, be condensed or reduced to liquid form.

Apparatus varying greatly in form and details may be used in carrying out my invention. As an instance of apparatus which may be used, I refer to the accompanying drawing, in which—

A represents the motive-power engine, B the condenser, and $a$ the exhaust-pipe of the engine, said pipe communicating with a manifold $a^4$, which supplies the coils $a^2$ in the condenser, said coils communicating at their lower ends with a manifold $a^3$, which discharges into a vessel $b$, the latter communicating through a pipe $c$, having a reducing-valve $c'$, with the manifold $c^2$ in the vaporizer D, said manifold supplying the coils $c^3$, which discharge into a manifold $c^4$ communicating through a pipe $c^5$ and also through a branch pipe $c^6$ with the suction-chamber of the pump F, the latter discharging through a pipe $d$ into the heater G, which is heated by any suitable means, gas-jets being shown in the drawing for the purpose. The heater also communicates through a pipe $f$ with the exhaust-pipe $a$.

Water from the vaporizer D is conveyed by means of a pump I and pipe $g$ to the condenser B, from which it overflows through a pipe $i$.

Suitable check-valves are provided to prevent backflow through the pipes and stop-valves to regulate or cut off the forward flow through the same.

The apparatus is shown and described more in detail in the application filed by me on the 6th day of October, 1893, Serial No. 487,313.

Having thus described my invention, I claim and desire to secure by Letters Patent—

1. A motive-power apparatus in which are combined an engine, a condenser, a vaporizer, a pump, a generator, means for conveying exhaust motive fluid under pressure from the engine to the condenser, provision in said condenser for reducing the motive fluid, while still under pressure, to liquid form, a pressure-reducing connection between the condenser and the vaporizer, connections between the latter and the generator, means for heating the motive fluid in said generator, and a communication between the generator and the engine, substantially as specified.

2. A motive-power apparatus in which are combined an engine, a condenser, a vaporizer, a pump, a generator, means for conveying exhaust motive fluid, under pressure, from the engine to the condenser, provision in said condenser for reducing the motive fluid, while still under pressure, to liquid form, a pressure-reducing connection between the condenser and the vaporizer, connections between the vaporizer and the pump, and between the latter and the generator, means for heating the motive fluid in said generator, a connection between the generator and the engine, and means for withdrawing from the vaporizer the liquid agent employed therein, and for feeding said liquid agent into the condenser, substantially as specified.

In testimony whereof I have signed my name to this specification in the presence of two subscribing witnesses.

DE LEON DAVIS.

Witnesses:
WILLIAM A. BARR,
JOSEPH H. KLEIN.